United States Patent
Kanematsu et al.

(10) Patent No.: US 9,151,589 B2
(45) Date of Patent: Oct. 6, 2015

(54) SURFACE TEXTURE MEASUREMENT DEVICE, CONTROLLER FOR SURFACE TEXTURE MEASUREMENT DEVICE, AND METHOD FOR CONTROLLING THE SAME

(71) Applicant: MITUTOYO CORPORATION, Kanagawa (JP)

(72) Inventors: Toshihiro Kanematsu, Miyazaki (JP); Hiroomi Honda, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 476 days.

(21) Appl. No.: 13/781,934

(22) Filed: Mar. 1, 2013

(65) Prior Publication Data

US 2013/0238281 A1    Sep. 12, 2013

(30) Foreign Application Priority Data

Mar. 8, 2012  (JP) .................................. 2012-051976

(51) Int. Cl.
| | |
|---|---|
| *G01B 5/28* | (2006.01) |
| *G01N 19/08* | (2006.01) |
| *G01B 21/04* | (2006.01) |
| *G01B 21/30* | (2006.01) |

(52) U.S. Cl.
CPC ................ *G01B 5/28* (2013.01); *G01B 21/042* (2013.01); *G01B 21/30* (2013.01)

(58) Field of Classification Search
CPC ............ G01B 5/28; G01B 5/285; G01B 5/20; G01B 5/201; G01B 21/20; G01B 21/30; G01N 19/08
See application file for complete search history.

(56) References Cited

U.S. PATENT DOCUMENTS

| | | | |
|---|---|---|---|
| 4,660,667 A | 4/1987 | Uchimura et al. | |
| 6,745,616 B1 * | 6/2004 | Katayama et al. | ............. 73/104 |

(Continued)

FOREIGN PATENT DOCUMENTS

| | | |
|---|---|---|
| GB | 2060963 | 5/1981 |
| JP | 5-034145 | 2/1993 |
| JP | 2000-310529 | 11/2000 |

OTHER PUBLICATIONS

U.S. Appl. No. 13/657,198, filed Oct. 22, 2012.

(Continued)

*Primary Examiner* — Toan Le (74) *Attorney, Agent, or Firm* — Greenblum & Bernstein, P.L.C.

(57) ABSTRACT

A surface texture measurement device capable of resolving errors for each entire display range, a controller for the surface texture measurement device, and a method for controlling the surface texture measurement device that includes selecting any one of the display ranges as a reference range and defining a calibration measurement value for each display range; sequentially inputting the calibration measurement values in place of the measurement values to the range amplifier corresponding to the reference range to obtain a reference display value $rDATAi$; inputting the calibration measurement values to the range amplifiers corresponding to each display range, then obtaining an AD-converted value $ADi$ and a display value $DATAi$; computing a gain error rate $ki=rDATAi/DATAi$, a display resolution $DIVi=DATAi/ADi$, and a corrected display resolution $cDIVi=DIVi \times ki$; and displaying the corrected display value $cDIVi=DIVi \times ki$.

6 Claims, 8 Drawing Sheets

(56) References Cited

U.S. PATENT DOCUMENTS

| 8,359,908 B2 | 1/2013 | Yamada et al. |
| 2012/0227476 A1 | 9/2012 | Nakayama |
| 2012/0234075 A1 | 9/2012 | Omori et al. |
| 2012/0266475 A1 | 10/2012 | Nakayama et al. |

OTHER PUBLICATIONS

U.S. Appl. No. 13/781,949, filed Mar. 1, 2013.
U.S. Appl. No. 13/780,705, filed Feb. 28, 2013.
E.P.O. Search Report, date is Jun. 28, 2013.

* cited by examiner

SURFACE TEXTURE MEASUREMENT DEVICE, CONTROLLER FOR SURFACE TEXTURE MEASUREMENT DEVICE, AND METHOD FOR CONTROLLING THE SAME

CROSS-REFERENCE TO RELATED APPLICATIONS

The present application claims priority under 35 U.S.C. §119 of Japanese Application No. 2012-051976, filed on Mar. 8, 2012, the disclosure of which is expressly incorporated by reference herein in its entirety.

BACKGROUND OF THE INVENTION

1. Field of the Invention

The present invention relates to a surface texture measurement device, a controller for the surface texture measurement device, and a method for controlling the surface texture measurement device. In particular, the present invention relates to a surface texture measurement device having a plurality of display ranges and to a method for controlling the surface texture measurement device.

2. Description of Related Art

Conventionally, a surface texture measurement device is known in which a surface of a work piece is scanned by a stylus to measure a surface texture thereof (surface roughness, undulations, shape in outline, and the like). In the surface texture measurement device, the stylus is moved in a fixed direction (X-axis direction) and is displaced in a vertical direction (Z-axis direction) of the stylus due to unevenness in the surface of the work piece. Amplification or A/D conversion of a detection signal is performed, then the signal is displayed on a display as a function of movement distance. In addition, in a roundness measurement device, which is a type of surface texture measurement device, the stylus is in stationary contact with an outer peripheral surface of a work piece having a rotational form. By then rotating the work piece, the outline shape is detected for one rotation of the work piece.

A displacement sensor used in the surface texture measurement device has a high level of sensitivity in general; however, a detection stroke (measurable range) of the displacement sensor is not large. In addition, a detection resolution is limited due to a performance of an A/D converter or due to a noise level of an amplifier, and thus the detection resolution cannot be made indefinitely larger. Thus, an amplification factor of the amplifier is switched to a plurality of levels and an appropriate selection can be made for display from a range with a high resolution and a short stroke through a range with a low resolution but a long stroke.

Figure 7:
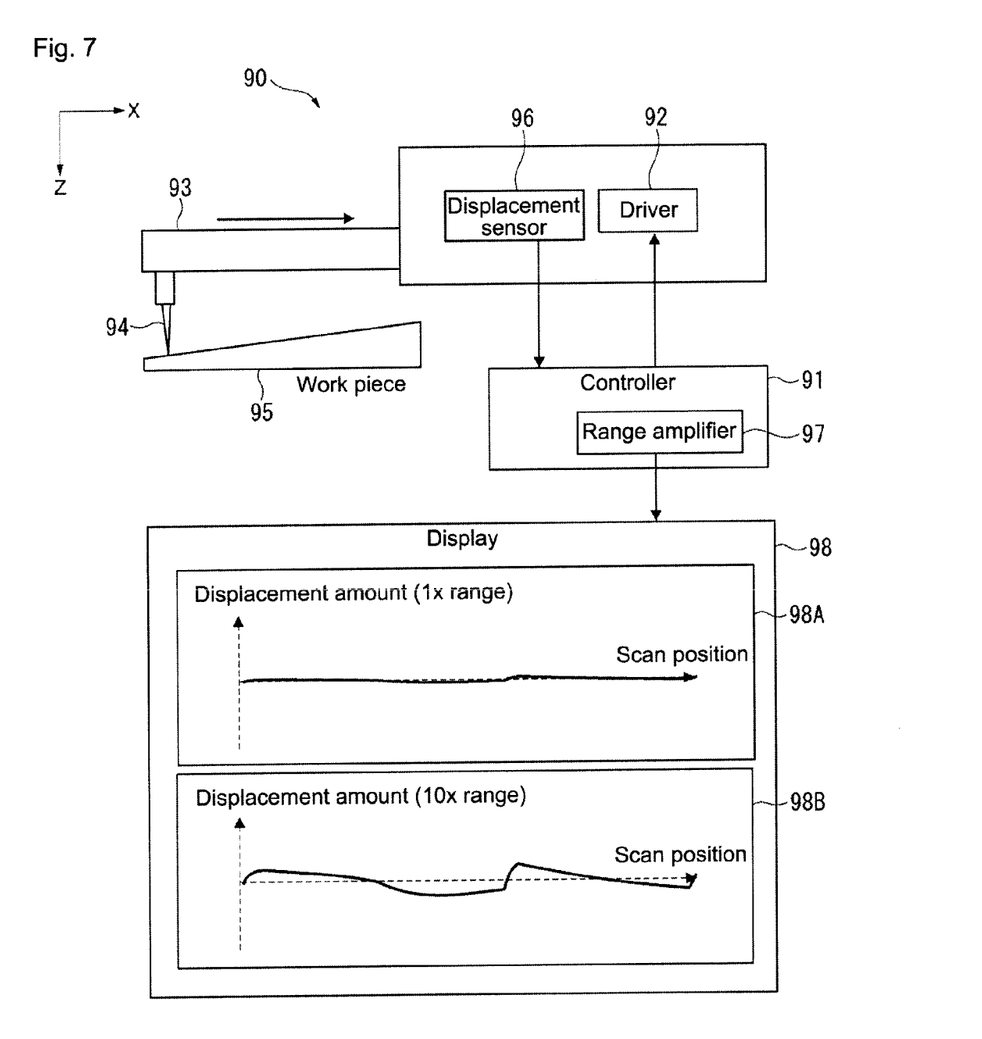
FIG. 7 is a frame view illustrating a schematic configuration of a conventional surface texture measurement device.

In a surface texture measurement device 90 in FIG. 7, when a driver 92 moves an arm 93 in the X-axis direction with a command from a controller 91, a stylus 94 displaces in the Z-axis direction according to unevenness in a surface of a work piece 95. The displacement is detected by a displacement sensor 96 and is sent to the controller 91. In the controller 91, a detection signal from the displacement sensor 96 is amplified by a range amplifier 97, and is then displayed on a display 98 as a graph of displacement amount corresponding to a scan position. For example, even in a case where the unevenness is unclear when the range amplifier 97 is set to a 1× range, as in a display 98A, by setting the range amplifier 97 to a 10× range, the unevenness can be clearly identified, as in a display 98B.

As a surface texture measurement device having a plurality of display ranges as described above, Japanese Patent Laid-open Publication Nos. 2000-310529 and H05-34145 are known. In Japanese Patent Laid-open Publication No. 2000-310529, displays in a plurality of display ranges are automatically switched in response to measurement data, thus improving appropriateness and efficiency of a measurement operation. In Japanese Patent Laid-open Publication No. H05-34145, for displays in a plurality of display ranges, an offset amount for each range can be automatically controlled for measured data, thus improving appropriateness and efficiency of a measurement operation.

In a surface texture measurement device, when switching between a plurality of display ranges to perform display, display errors may arise due to characteristics of a processing system for each display range or the like. Specifically, in each of the display ranges of the surface texture measurement device, one measurement value is converted to a display value with gain for each range. However, when there is an error in an amplifier for each range, there is a possibility that even when the measurement value is the same, a different display value will result for each display range. For example, at a 10 μm range, a display is 0.60 μm; however, at a 1 μm range, a display is 0.61 μm.

In response to such errors between ranges, a user can resolve the errors by controlling a device for each display range. Meanwhile, when switching between display ranges is performed automatically as in Japanese Patent Laid-open Publication No. 2000-310529, when a user controls each of the switches, the benefit of automation is undermined. Thus, a technology capable of automating even error control, as in Japanese Patent Laid-open Publication No. H05-34145, is very meaningful. The errors between ranges that Japanese Patent Laid-open Publication No. H05-34145 attempts to resolve are chiefly errors in an offset amount for each range. Offset errors are representative of errors between ranges; however, it has become clear that simply resolving offset errors is insufficient for resolving errors between ranges.

Figure 8:
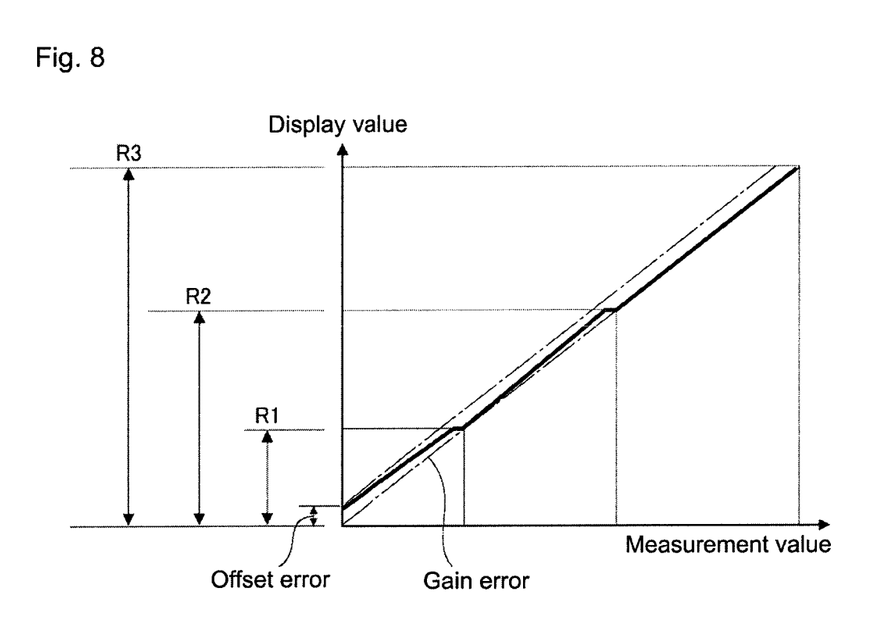
FIG. 8 is a graph illustrating measurement results in the conventional surface texture measurement device.

In FIG. 8, the display values are shown on the vertical axis with respect to the measurement values on the horizontal axis. The relationship between each value is basically a proportional relation having a positive slope. In conventional switching between display ranges, when the measurement value is small, a display range R1 having a high amplification factor is used. As the measurement value becomes larger, display is performed by switching to display ranges R2 and R3. Errors between ranges arise in each of the display ranges R1 to R3. As mentioned previously, the offset error is representative of the error between ranges and appears in the graph of FIG. 8 as a step between each display range. The offset error corresponds to parallel translation on the graph; however, actual errors between ranges also appear as an inclination in the graph. Accordingly, simply resolving the offset error described above stalls at a partial resolution of the error between ranges. Thus, development of a technology capable of resolving errors for each entire display range is desired.

SUMMARY OF THE INVENTION

The present invention provides a surface texture measurement device, a controller for the surface texture measurement device, and a method for controlling the surface texture measurement device capable of resolving errors for each entire display range.

In addition to an offset error (representative of an error between ranges), the present invention also corrects a gain error (a different representative error between ranges) and thus achieves resolution of errors for each entire display range. Specifically, in FIG. 8, a change in amplified gain for each display range is shown as an incline in the graph for each display range. By correcting this gain error, the present invention attempts to resolve errors in each entire display range. To this end, the present invention includes structures as indicated hereafter.

The surface texture measurement device of the present invention includes a displacement sensor detecting displacement of a surface of a work piece; a display displaying measurement results; and a controller processing a detection signal from the displacement sensor and displaying the measurement results on the display. The controller includes a sensor circuit, a range amplifier circuit, an AD converter, and a digital converter. The sensor circuit processes the detection signal from the displacement sensor and outputs the detection signal as the measurement value. The range amplifier circuit includes a plurality of range amplifiers amplifying the measurement value at different amplification factors. The AD converter performs digital conversion of an analog signal amplified by the range amplifier circuit. The digital circuit processes an AD-converted value converted by the AD converter and displays the AD-converted value on the display in a plurality of display ranges corresponding to the range amplifiers. In the surface texture measurement device, the digital circuit displays a product of the AD-converted value converted by the AD converter and a corrected display resolution corresponding to the display range as a corrected display value on the display. For the corrected display resolution, any one of the display ranges is selected as a reference range and a calibration measurement value is defined for each of the display ranges. The calibration measurement values are sequentially input in place of the measurement values to the range amplifier corresponding to the reference range to obtain as a reference display value a display value displayed on the display. The calibration measurement values corresponding to each of the display ranges are input in place of the respective measurement values to the range amplifiers corresponding to each of the display ranges, then the AD-converted value and the display value displayed on the display is obtained for each of the display ranges. For each of the display ranges, the gain error rate is computed by dividing the reference display value by the display value; the display resolution is computed by dividing the display value by the AD-converted value; and the product of the display resolution and the gain error rate is recorded as the corrected display resolution.

A controller of a surface texture measurement device of the present invention is provided to the surface texture measurement device including a displacement sensor detecting displacement of a surface of a work piece and a display displaying measurement results. The controller processes a detection signal from the displacement sensor and displays the measurement results on the display. The controller includes a sensor circuit, a range amplifier circuit, an AD converter, and a digital circuit. The sensor circuit processes the detection signal from the displacement sensor and outputs the detection signal as a measurement value. The range amplifier circuit includes a plurality of range amplifiers amplifying the measurement value at different amplification factors. The AD converter performs digital conversion of an analog signal amplified by the range amplifier circuit. The digital circuit processes an AD-converted value converted by the AD converter and displays the AD-converted value on the display in a plurality of display ranges corresponding to the range amplifier. In the controller, the digital circuit displays a product of the AD-converted value converted by the AD converter and a corrected display resolution corresponding to the display range as a corrected display value on the display. For the corrected display resolution, any one of the display ranges is selected as a reference range and a calibration measurement value is defined with respect to each of the display ranges. The calibration measurement values are sequentially input in place of the measurement values to the range amplifier corresponding to the reference range to obtain a display value displayed on the display as a reference display value. The calibration measurement values corresponding to each of the display ranges are input in place of the respective measurement values to the range amplifiers corresponding to each of the display ranges, then the AD-converted value and the display value displayed on the display are obtained for each of the display ranges. For each of the display ranges, a gain error rate is computed by dividing the reference display value by the display value; a display resolution is computed by dividing the display value by the AD-converted value; and a product of the display resolution and the gain error rate is recorded as the corrected display resolution.

A method for controlling a surface texture measurement device controls the surface texture measurement device including a displacement sensor detecting displacement of a surface of a work piece, a display displaying measurement results, and a controller processing a detection signal from the displacement sensor and displaying the measurement results on the display. The controller includes a sensor circuit, a range amplifier circuit, an AD converter, and a digital circuit. The sensor circuit processes the detection signal from the displacement sensor and outputs the detection signal as the measurement value. The range amplifier circuit includes a plurality of range amplifiers amplifying the measurement value at different amplification factors. The AD converter performs digital conversion of an analog signal amplified by the range amplifier circuit. The digital circuit processes an AD-converted value converted by the AD converter and displays the AD-converted value on the display in a plurality of display ranges corresponding to the range amplifiers. The method for controlling the surface texture measurement device includes selecting any one of the display ranges as a reference range and defining a calibration measurement value for each of the display ranges; sequentially inputting the calibration measurement values in place of the measurement values to the range amplifier corresponding to the reference range to obtain a display value displayed on the display as a reference display value; inputting the calibration measurement values corresponding to each of the display ranges in place of the respective measurement values to the range amplifiers corresponding to each of the display ranges, then obtaining the AD-converted value and the display value displayed on the display for each of the display ranges; computing a gain error rate by dividing the reference display value by the display value, computing a display resolution by dividing the display value by the AD-converted value, and recording a product of the display resolution and the gain error rate as the corrected display resolution for each of the display ranges; and displaying as the corrected display value a product of the AD-converted value converted by the AD converter and the corrected display resolution corresponding to the display range on the display, using the digital circuit.

In the present invention as described above, when displaying measurement results on the display with the controller, display with a plurality of display ranges can be performed. In addition, gain error for the range amplifier performing display in each of the display ranges can be corrected (gain error correction) and the measurement results displayed by each display range can be made accurate. Specifically, one of the plurality of display ranges is used as the reference range to compute the gain error rate between the reference range and the other display ranges. The display resolution of each display range is then controlled based on the gain error rate. Accordingly, the gain can be controlled for each display range using the reference range as a reference. As a result of this gain error correction, display at the corrected display resolution using the reference range as the reference as well as resolution of a range error for the reference range become possible in all display ranges. The gain error correction also enables resolution of errors for each entire display range.

In the present invention, obtaining the AD-converted value and the display value for the range amplifier corresponding to each display range and recording the corrected display resolution for each display range can be performed sequentially for each of the display ranges. Alternatively, after the AD-converted values and the display values are obtained for all display ranges, the corrected display resolutions for all display ranges may be recorded collectively. In the present embodiment, obtaining the reference display value with the range amplifier corresponding to the reference range can be performed prior to obtaining the AD-converted value and the display value for the range amplifier corresponding to each display range, or can be performed thereafter, or in parallel. In short, the order is determined such that data required for recording the corrected display resolution for each of the display ranges is available.

The surface texture measurement device of the present invention preferably includes a level shift circuit between the sensor circuit and the range amplifier circuit, the level shift circuit adding a level shift amount to the measurement value from the sensor circuit. The level shift amount is preferably designated by the offset amount for each of the display ranges, received from the digital circuit. The offset amount is preferably treated as the level shift amount at a point when the level shift amount is controlled such that the AD-converted value is equal to a predetermined value in a state where the measurement value output from the sensor circuit is a predetermined reference voltage.

The controller for the surface texture measurement device of the present invention preferably includes the level shift circuit between the sensor circuit and the range amplifier circuit, the level shift circuit adding the level shift amount to the measurement value from the sensor circuit. The level shift amount is preferably designated by the offset amount for each of the display ranges, received from the digital circuit. The offset amount is preferably treated as the level shift amount at a point when the level shift amount is controlled such that the AD-converted value is equal to a predetermined value in a state where the measurement value output from the sensor circuit is a predetermined reference voltage.

In the method for controlling the surface texture measurement device of the present invention, the surface texture measurement device preferably includes the level shift circuit between the sensor circuit and the range amplifier circuit, the level shift circuit adding the level shift amount to the measurement value from the sensor circuit. The level shift amount is preferably designated by the offset amount for each of the display ranges, received from the digital circuit. The method for controlling the surface texture measurement device preferably includes, in each of the display ranges, the measurement value output from the sensor circuit being a predetermined reference voltage; controlling the level shift amount such that the AD-converted value is equal to a predetermined value in such a state; and treating the level shift amount at this point as the offset amount.

In the present invention as described above, offset control can be performed for circuits ranging from the range amplifier circuit to the AD converter. In particular, by defining the offset amount for each display range (i.e., for each range amplifier), when the display range is switched, the corresponding offset amount can be defined.

In the present invention, 0 volts, for example, can be employed as the predetermined reference voltage and the reference voltage can be easily obtained by grounding the device. In such a case, the predetermined value of the AD-converted value may also be set to 0 (i.e., the level shift amount may be controlled such that the AD-converted value is equal to 0). This offset control is preferably performed before gain error correction in the present invention. However, the offset control may be after the gain error correction or may be performed in parallel.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
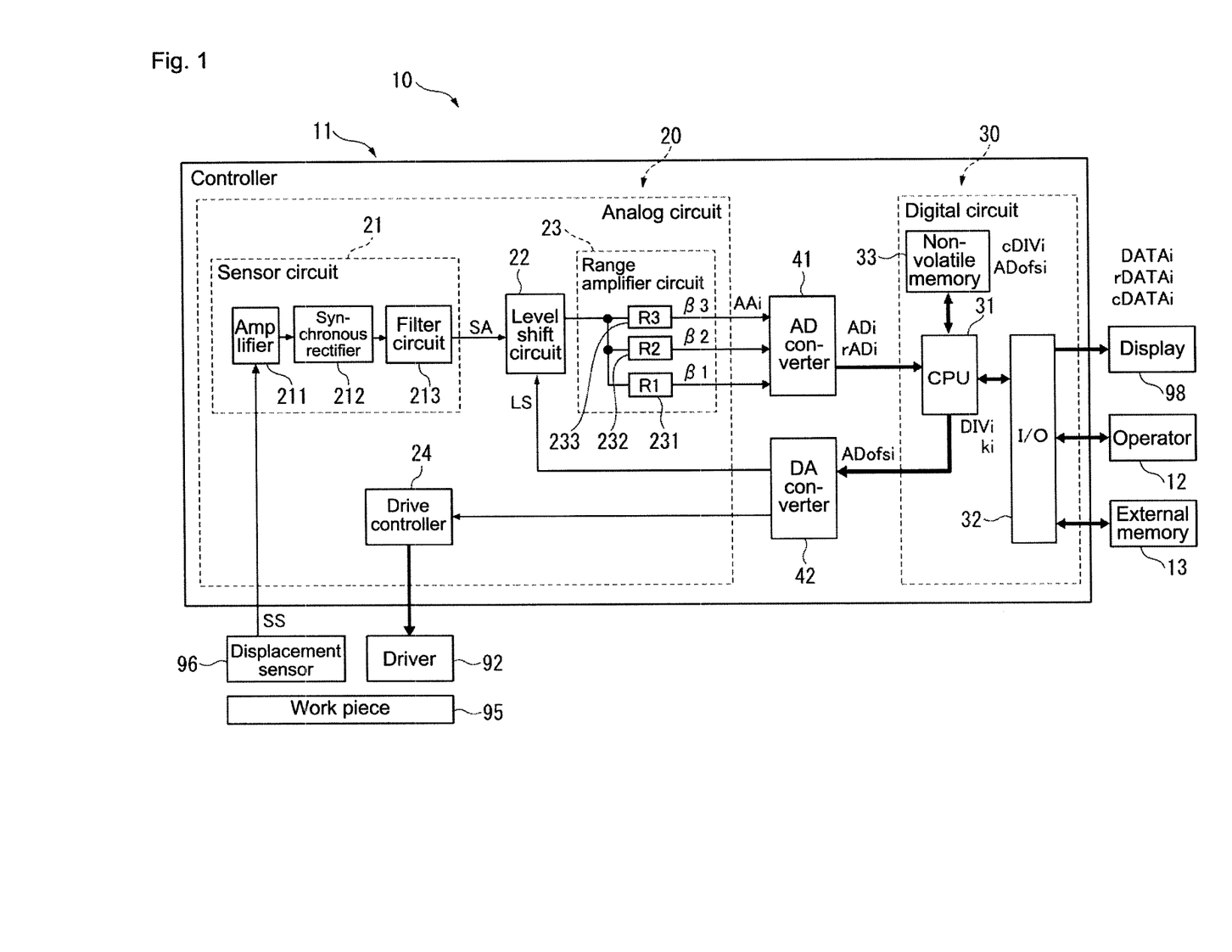
FIG. 1 is a block diagram illustrating an embodiment of a surface texture measurement device according to the present invention.

Hereafter, an embodiment of the present invention is described with reference to the drawings. In FIG. 1, a surface texture measurement device 10 according to the present embodiment is provided with a configuration similar to a conventional surface texture measurement device 90 (see FIG. 7) described above. Specifically, as described by FIG. 7, in the surface texture measurement device 90, a driver 92 moves an arm 93 in an X-axis direction. A stylus 94 is displaced in a Z-axis direction according to unevenness in a surface of a work piece 95. This displacement is detected by a displacement sensor 96 and is then sent to a controller 91. A detection signal from the displacement sensor 96 is amplified in the controller 91 by a range amplifier 97 and is displayed on a display 98 as a graph of displacement amount corresponding to a scan position. The surface texture measurement device 10 of the present embodiment has a similar configuration to that described above. Accordingly, in FIG. 1 and in the following description, the same reference numerals are used for elements similar to those of FIG. 7 and duplicative descriptions are omitted.

In FIG. 1, the surface texture measurement device 10 of the present embodiment includes a controller 11 based on the present invention. The driver 92, the displacement sensor 96, and the display 98 are connected to the controller 11. In addition, an operator 12 and a high-capacity exterior memory 13 are connected to the controller 11. The operator 12 serves to perform operations such as operation instruction and definition and the high-capacity exterior memory 13 stores information. The controller 11 includes an analog circuit 20 and a digital circuit 30. An AD converter 41 and a DA converter 42 are provided between the analog circuit 20 and the digital circuit 30. The AD converter 41 performs digital conversion of an analog signal output from the analog circuit 20 and passes the signal to the digital circuit 30. The DA converter 42 performs analog conversion of a digital signal output from the digital circuit 30 and transmits the signal to the analog circuit 20.

The analog circuit 20 includes a sensor circuit 21 performing a process to, for example, amplify a detection signal SS from the displacement sensor 96 and outputting the detection signal SS as a measurement value SA. The measurement value SA is obtained by, for example, the detection signal SS being amplified by an amplifier 211 and rectified by a synchronous rectifier 212, after which the detection signal SS passes through a filter circuit 213. In addition, the analog circuit 20 includes a level shift circuit 22 and a range amplifier circuit 23. The level shift circuit 22 performs level shifting (offset control or bias control) on the measurement value SA output from the sensor circuit 21 with a predetermined level shift amount LS. The range amplifier circuit 23 includes a plurality of range amplifiers 231 to 233 amplifying the level-shifted measurement value SA at different amplification factors. Moreover, the analog circuit 20 includes a drive control circuit 24 controlling the driver 92 based on an operation command from the digital circuit 30.

In order to perform display in a plurality n of display ranges Ri (i=1 to n), the range amplifier circuit 23 includes n range amplifiers. In the present embodiment, n=3 and three range amplifiers 231 to 233 are provided to correspond to display ranges R1 to R3. A range amplifier corresponding to each display range Ri (i=1 to n) has an amplification factor of βi. In the present embodiment, the amplification factors of the range amplifiers 231 to 233 corresponding to the display ranges R1 to R3 are β1 to β3, respectively. Moreover, when an output from the range amplifier for each display range Ri is an amplified measurement value AAi, the amplification factor βi of each range amplifier Ri equals the amplified measurement value AA divided by the sum of the measurement value SA and the level shift amount LS. The amplified measurement value AAi undergoes digital conversion by the AD converter 41 and is passed to the digital circuit 30 as an AD-converted value ADi. In the present embodiment, the amplified measurement values AA1 to AA3 for each of the display ranges R1 to R3 are passed to the digital circuit 30 as AD-converted values AD1 to AD3.

The digital circuit 30 includes a CPU 31 using a microprocessor or the like. The CPU 31 is connected to the display 98, the operator 12, and the exterior memory 13 via an input/output interface (I/O) 32. A non-volatile memory 33 such as a flash ROM can be connected to the CPU 31 and can appropriately store data used in processing. The CPU 31 operates using an operation program written to a program area not shown in the drawings and performs the following operation.

The operation command is output based on the operation program. This operation command is transmitted to the drive control circuit 24 via the DA converter 42 and causes the driver 92 to execute a designated measurement. Thereby, the surface texture of the work piece 95 is detected by the displacement sensor 96 and is transmitted to the sensor circuit 21 as the detection signal SS. The AD-converted value ADi is passed from the range amplifier circuit 23 in the analog circuit 20 through the AD converter 41. The AD-converted value ADi then undergoes a predetermined process and a graph of the measurement results (graph of an X-axis movement position and a Z-axis displacement) is displayed on the display 98 with any of the display ranges Ri. At this point, when a display value DATA for a length of the graph on a screen is the measurement result for the AD-converted value ADi in the graph displayed on a display screen of the display 98, a display resolution DIVi for the display range Ri on the display 98 is in a relationship where the display value DATA=ADi× DIVi.

In the surface texture measurement device such as that in the present embodiment, as described previously, an error in the amplification factor βi of the range amplifier for each display range Ri, for example, affects the AD-converted value ADi. As a result, the error between ranges is reflected in the display value DATA displayed on the display 98, as well. In order to resolve such errors between ranges, a control procedure based on the present invention is performed before the measurement operation.

Figure 2:
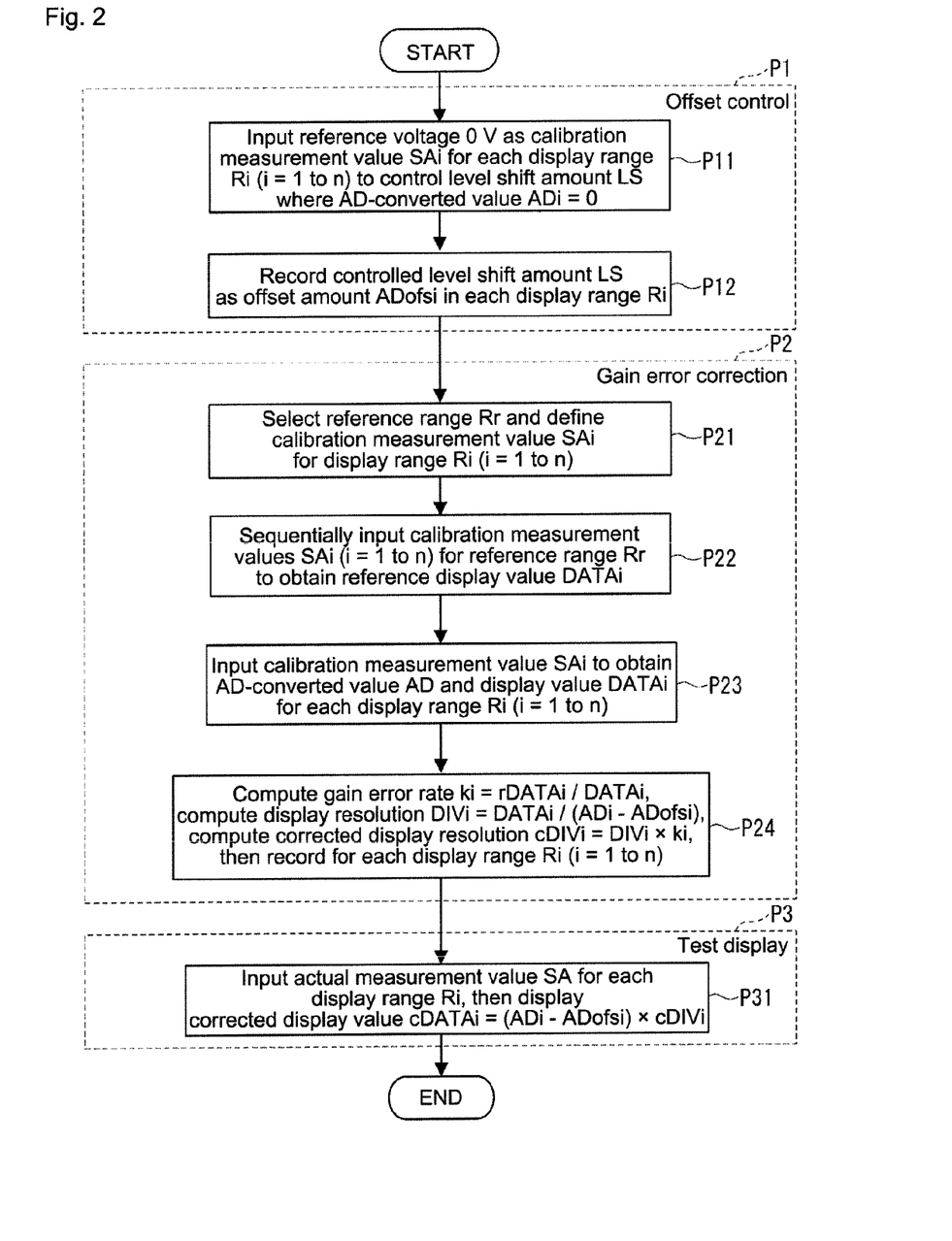
FIG. 2 is a flow chart illustrating control procedures in the embodiment.

In FIG. 2, the control procedure based on the present invention includes an offset control stage P1, a gain error correction stage P2, and a test display stage P3. The offset control stage P1 is not necessary for the present invention, but is preferably executed in order to improve control results. The gain error correction stage P2 is a necessary procedure based on the present invention. The test display stage P3 is a procedure used when verification of results is desired, and may be omitted as appropriate. FIG. 2 is generalized using n number of display ranges. However, as described previously, in the present embodiment, n=3 (i.e., the number of display ranges i=1 to 3) in order to apply the configuration of FIG. 1.

In the offset control stage P1, steps P11 and P12 are executed. In the step P11, a reference voltage of 0 V is input to the level shift circuit 22 for each display range Ri (i=1 to n) as a calibration measurement value SAi in order to control the level shift amount LS where the AD-converted value ADi=0. In the step P12, the controlled level shift amount LS is recorded as an offset amount ADofsi in each display range Ri.

Specifically, first, the range amplifier 231 for the display range R1 is selected and the reference voltage of 0 V is input to the level shift circuit 22 as the calibration measurement value SA1 in order to control the level shift amount LS where the AD-converted value AD1=0. When the control is complete, the level shift amount LS is recorded as the offset amount ADofs1 for the display range R1. Next, the range amplifier 232 for the display range R2 is selected and the level shift amount LS is similarly recorded as an offset amount ADofs2, then an offset amount ADofs3 is recorded for the display range R3.

Figure 3:
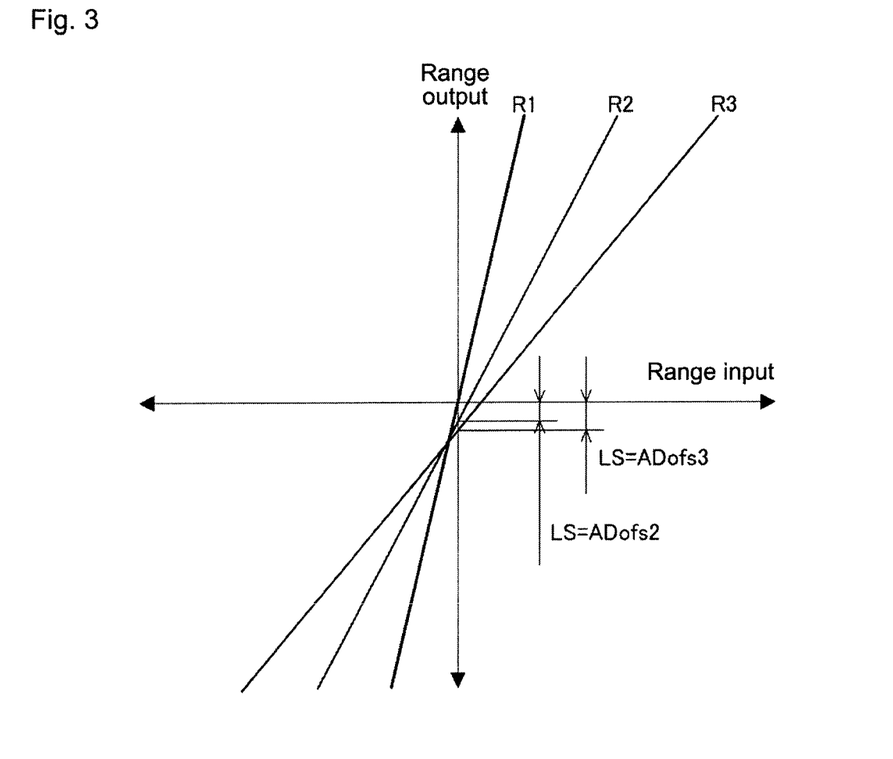
FIG. 3 is a graph illustrating information controlled in the embodiment.

For example, in FIG. 3, with respect to a range input (the calibration measurement value SA1 input to the level shift circuit 22), a range output for each display range R1 to R3 (amplified measurement results AA1 to AA3, which are outputs of the range amplifiers 231 to 233) form respective straight lines having positive slope. When the range input for each of the display ranges R1 to R3 is 0, the range output for the display range R1 is 0. However, the range outputs for the display ranges R2 and R3 are not 0. For the display ranges R2 and R3, the range outputs can be made 0 by adding the level shift amount LS. This level shift amount LS is recorded as the offset amounts ADofs2 and ADofs3.

The offset amount ADofsi (i=1 to 3) obtained in this way is an offset amount for aligning outputs when each input is the same. By level shifting the actual measurement value SAi with this offset amount, correction of the offset error between each of the display ranges 1 to 3 can be performed.

In the gain error correction stage P2, steps 21 through 24 are executed. In the step P21, any one of the display ranges Ri (i=1 to n) is selected as a reference range Rr. Then the calibration measurement value SAi is defined for each of the display ranges Ri (i=1 to n). At this point, the calibration measurement value SAi is preferably defined as a value close to the greatest range value for a range having the greatest amplification factor among each of the display ranges Ri and the reference range Rr.

Figure 4:
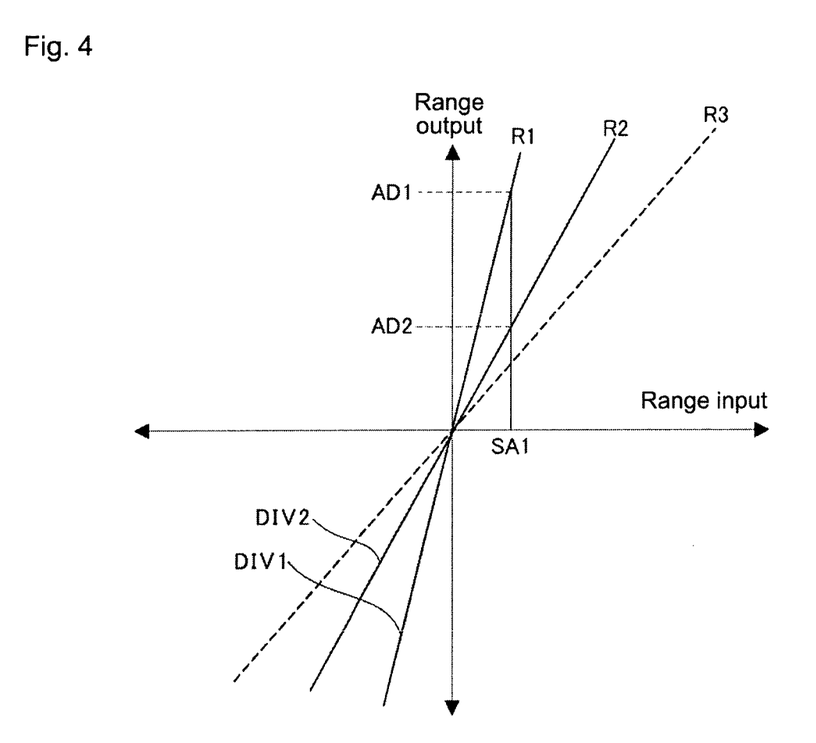
FIG. 4 is a graph illustrating information controlled in the embodiment.

For example, in FIG. 4, the display range R2 is selected as the reference range. The calibration measurement value SAi for the display range R1 is defined with respect to the display range R2, which is the reference range. In such a case, when the calibration measurement value SA1 is used as the range input (input to the level shift circuit 22), the AD-converted value of the range output for the display range R1 (i.e., the amplified measurement value AA1, which is the output of the range amplifier 231) is the AD-converted value AD1 and the AD-converted value of the range output for the display range R2 (i.e., the amplified measurement AA2, which is the output of the range amplifier 232) is the AD-converted value AD2. In such a case, an incline of the graph for the display range R1 (amplification factor $\beta 1$) is greater than the incline of the graph for the display range R2 (amplification factor $\beta 2$). Therefore, the calibration measurement value SA1 may be selected that gives the AD-converted value AD1 close to the greatest range value for the display range R1.

Figure 5:
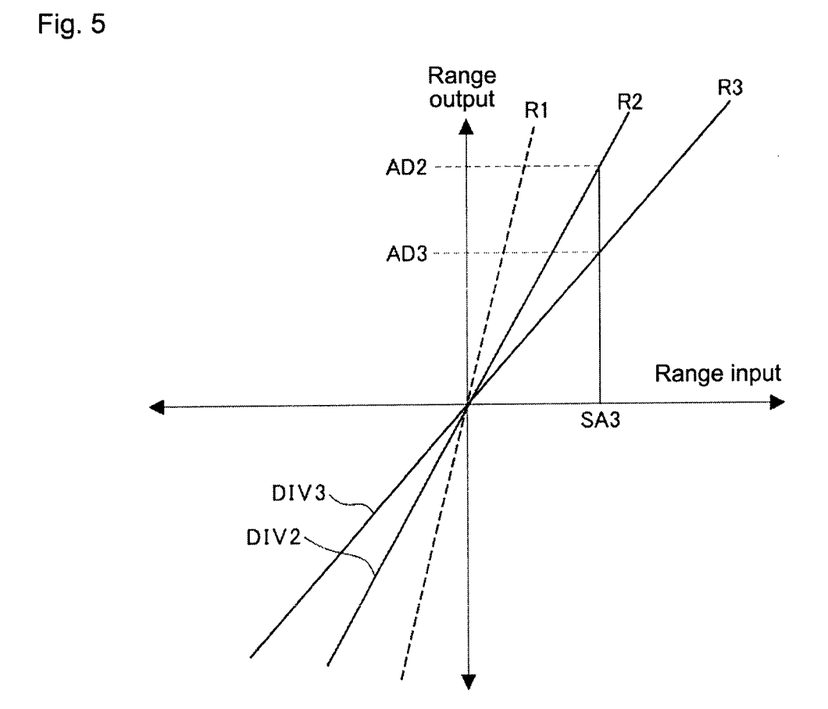
FIG. 5 is a graph illustrating information controlled in the embodiment.

Meanwhile, in FIG. 5, the calibration measurement value SA3 for the display range R3 is defined with respect to the display range R2 (the reference range). In such a case, similarly, the AD-converted value of the range output for the display range R2 (i.e., the amplified measurement value AA2, which is the output of the range amplifier 232) is the AD-converted value AD2 and the AD-converted value of the range output for the display range R3 (i.e., the amplified measurement AA3, which is the output of the range amplifier 233) is the AD-converted value AD3. In such a case, the incline of the graph for the display range R2 (amplification factor $\beta 2$) is greater than the incline of the graph for the display range R3 (amplification factor $\beta 3$). Therefore, the calibration measurement value SA3 may be selected that gives the AD-converted value AD2 close to the greatest range value for the display range R2.

In the step P22, the reference range Rr (i.e., the range amplifier corresponding to the reference range Rr) is selected. Then, with the reference range RR selected, the calibration measurement value SAi (i=1 to n) is sequentially input to the level shift circuit 22. Then, a reference display value rDATAi (i=1 to n) is obtained from the length of the graph in a displayed image on the display 98. The obtained reference display value rDATAi (i=1 to n) is obtained by inputting each of the calibration measurement values SAi (i=1 to n) to the range amplifier corresponding to the reference range Rr (shared reference range amplifier). The obtained reference display value rDATAi (i=1 to n) reflects characteristics of the reference range Rr with respect to each of the calibration measurement values SAi (i=1 to n).

In the step P23, each calibration measurement value SAi for each of the display ranges Ri (i=1 to n) is input to the level shift circuit 22 and the AD-converted value ADi output for the calibration measurement value SAi is obtained. In addition, the display value DATAi is obtained from the length of the graph in the displayed image on the display 98. The obtained AD-converted value ADi and display value DATAi reflect the characteristics of the range amplifier corresponding to each of the display ranges Ri (i=1 to n) with respect to each of the calibration measurement values SAi.

In the step P24, each of the following values is computed for each of the display ranges Ri (i=1 to n). A gain error rate ki is found by ki=rDATAi/DATAi. The gain error rate ki is a ratio of the reference display value rDATAi (after amplifying the same calibration measurement value SAi in the range amplifier for the reference range Rr) and the display value DATAi (after amplifying the same calibration measurement value SAi in the range amplifier for each of the display ranges Ri). The effect of an error between ranges for each of the display ranges Ri that include the amplification factor $\beta i$ is bundled and can be measured as a ratio with respect to the reference range Rr.

The display resolution DIVi is a display resolution for the display range Ri displayed on the display 98 and is computed by DIVi=DATAi/(ADi−ADofsi). At this point, the display value DATAi still includes errors between ranges for each of the display ranges Ri and the display resolution DIVi also includes errors between ranges. A corrected display resolution cDIVi is found by cDIVi=DIVi×ki. As previously described, the display resolution DIVi includes errors between ranges; however, the effect of errors between ranges in each of the display ranges Ri is bundled and corrected by the gain error rate ki, which is measured as a ratio with respect to the reference range Rr. Thereby, the errors between ranges can be resolved in the corrected display resolution cDIVi.

In the test display stage P3, as in a step P31, the actual measurement value SA is input for each of the display ranges Ri (i=1 to n), then a corrected display value cDATAi=(ADi−ADofsi)×cDIVi is displayed. In the present embodiment, by using the corrected display resolution cDIVi to perform calculations with the AD-converted value ADi and the offset amount ADofsi and to display on the display 98, the corrected display value cDATAi=(ADi−ADofsi)×cDIVi that does not include the errors between ranges can be obtained. In addition, by performing display using the corrected display value cDATAi, the errors between ranges can be resolved between each of the display ranges Ri (i=1 to n) on the display 98.

The gain error correction stage P2 (steps P21 through P24) was described using a specific example of the present embodiment, which includes three display ranges R1 to R3. First, based on the step P21, the middle display range R2 was selected as the reference range from among the display ranges R1 to R3. Then, as shown in the specific example of FIGS. 4 and 5 above, the calibration measurement values SA1 and SA3 are defined for the display ranges R1 and R3, which are not the reference range. Next, based on the step P22, in a state where the display range R2 (the reference range) is selected, the calibration measurement value SA1 is input to measure the reference display value rDATA1 and the calibration measurement value SA3 is input to measure the reference display value rDATA3.

Then, based on the step P23, in a state where the display range R1 (a display range other than the reference range) is selected, the calibration measurement value SA1 is input to measure the AD-converted value AD1 and the display value DATA1. Similarly, in a state where the display range R3 is selected, the calibration measurement value SA3 is input to measure the AD-converted value AD3 and the display value DATA3. Moreover, based on the step P24, the gain error rates k1 and k3, the display resolutions DIV1 and DIV3, and the corrected display resolutions cDIV1 and cDIV3 are computed for the display ranges R1 and R3, which are not the reference range.

$$k1 = rDATA1/DATA1$$

$$k3 = rDATA3/DATA3$$

$$DIV1 = DATA1/(AD1-ADofs1)$$

$$DIV3 = DATA3/(AD3-ADofs3)$$

$$cDIV1 = DIV1 \times k1$$

$$cDIV3 = DIV3 \times k3$$

Moreover, because the display range R2 (the reference range) is itself the reference, the gain error rate $k2 = rDATA2/DATA2 = 1$ and the corrected display resolution $cDIV2 = DIV2 \times 1 = DATA2/(AD2-ADofs2)$.

Following these calculations, the errors between ranges for the display ranges 1 to 3 can be resolved by using the corrected display values cDATAi to perform the display.

$$cDATA1 = (AD1-ADofs1) \times cDIV1$$

$$cDATA2 = (AD2-ADofs2) \times cDIV2$$

$$cDATA3 = (AD3-ADofs3) \times cDIV3$$

Figure 6:
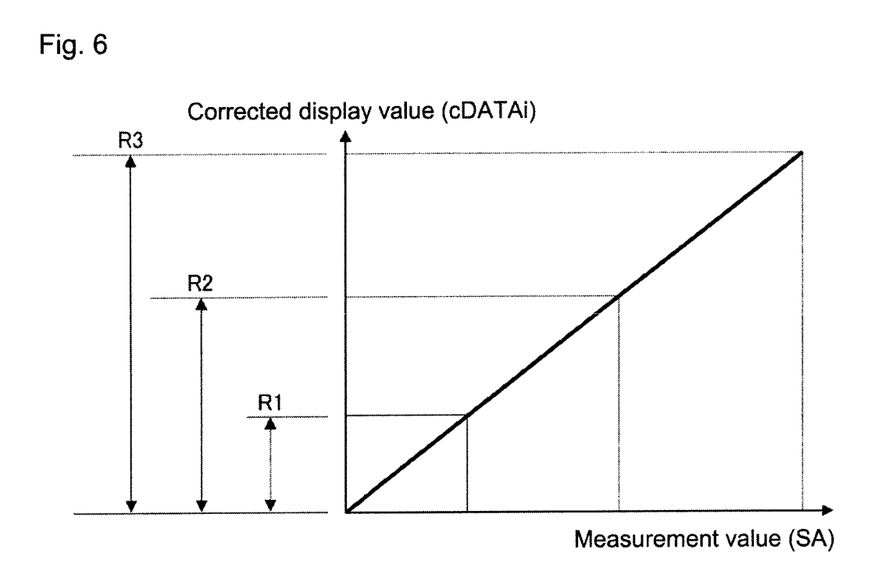
FIG. 6 is a graph illustrating control results in the embodiment.

By performing display employing these corrected display values cDATAi, the gain error in the incline can be resolved with the corrected display resolution cDIVi and correction using the ADofsi can be performed on the offset error. Thereby, according to the surface texture measurement device 10 of the present embodiment, as shown in FIG. 6, a smooth, continuous graph can be obtained between each of the display ranges R1 to R3 and the errors between ranges arising from switching between the display ranges R1 to R3 can be resolved.

Moreover, the present invention is not limited to the embodiment described above, but may include modifications within a scope not departing from the object of the present invention. In the above-described embodiment, three display ranges R1 to R3 are used and the middle display range R2 is used as the reference range Rr. However, the display range R1 may also be used as the reference range, for example, and gain error rates k2 and k3 may be computed for the other display ranges R2 and R3. In the present embodiment, three display ranges Ri were used, but four or more may also be used.

In the above-described embodiment, in order to correct the offset error as well, the offset amount ADofsi is computed in the offset control stage P1. By taking the offset amount ADofsi into account in the gain error correction stage P2, the resolution DIVi is calculated by $DIVi = DATAi/(ADi-ADofsi)$. In addition, the corrected display value $cDATAi = (ADi-ADofsi) \times cDIVi$ is used for display. However, the computation of the offset error may be omitted. In such a case, the resolution $DIVi = DATAi/ADi$ may be computed in the gain error correction stage P2 and the corrected display value $cDATAi = ADi \times cDIVi$ may be displayed. Other configurations in the surface texture measurement device 10, such as the configurations of the analog circuit 20, the digital circuit 30, or the driver 92, the displacement sensor 96, and the display 98 which are connected to the controller 11 may be modified as appropriate.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface texture measurement device comprising:
a displacement sensor configured to detect displacement of a surface of a work piece;
a display configured to display measurement results; and
a controller configured to process a detection signal from the displacement sensor and further configured to display the measurement results on the display,
wherein the controller comprises:
a sensor circuit configured to process the detection signal from the displacement sensor and further configured to output the detection signal as the measurement value;
a range amplifier circuit including a plurality of range amplifiers configured to amplify the measurement value at different amplification factors;
an AD converter configured to perform digital conversion of an analog signal amplified by the range amplifier circuit; and
a digital circuit configured to process an AD-converted value converted by the AD converter and farther configured to display the AD-converted value on the display in a plurality of display ranges corresponding to the range amplifiers, wherein the digital circuit is further configured to display a product of the AD-converted value converted by the AD converter and a corrected display resolution corresponding to the display range as a corrected display value on the display, and
wherein the corrected display resolution is defined by:
the selection of one of the display ranges as a reference range and the definition of a calibration measurement value for each of the display ranges;
the sequential input of the calibration measurement values in place of the measurement values to the range amplifier corresponding to the reference range to obtain, as a reference display value, a display value displayed on the display;
the input of the calibration measurement values corresponding to each of the display ranges in place of the respective measurement values to the range amplifiers corresponding to each of the display ranges, and then the obtainment of the AD-converted value and the display value displayed on the display for each of the display ranges; and
for each of the display ranges, the computation of a gain error rate by dividing the reference display value by the display value, the computation of a display resolution by dividing the display value by the AD-converted value, and the recordation of a product of the display resolution and the gain error rate as the corrected display resolution.

2. The surface texture measurement device according to claim 1, further comprising:
a level shift circuit between the sensor circuit and the range amplifier circuit, the level shift circuit configured to add a level shift amount to the measurement value from the sensor circuit, wherein the level shift amount is designated by an offset amount for each of the display ranges, received from the digital circuit, and the offset amount is treated as the level shift amount at a point when the level shift amount is controlled such that the AD-converted value is equal to a predetermined value in a state where the measurement value output from the sensor circuit is a predetermined reference voltage.

3. A controller of a surface texture measurement device comprising a displacement sensor detecting displacement of a surface of a work piece and a display displaying measurement results, the controller processing a detection signal from the displacement sensor and displaying the measurement results on the display, the controller comprising:
a sensor circuit configured to process the detection signal from the displacement sensor and further configured to output the detection signal as a measurement value;
a range amplifier circuit including a plurality of range amplifiers configured to amplify the measurement value at different amplification factors;
an AD converter configured to perform digital conversion of an analog signal amplified by the range amplifier circuit; and
a digital circuit configured to process an AD-converted value converted by the AD converter and further configured to display the AD-converted value on the display in a plurality of display ranges corresponding to the range amplifiers, wherein the digital circuit is configured to display a product of the AD-converted value converted by the AD converter and a corrected display resolution corresponding to the display range as a corrected display value on the display, and
wherein the corrected display resolution is defined by:
the selection of one of the display ranges as a reference range and the definition of a calibration measurement value for each of the display ranges;
the sequential input of the calibration measurement values in place of the measurement values to the range amplifier corresponding to the reference range to obtain, as a reference display value, a display value displayed on the display;
the input of the calibration measurement values corresponding to each of the display ranges in place of the respective measurement values to the range amplifiers corresponding to each of the display ranges, then the obtainment of the AD-converted value and the display value displayed on the display for each of the display ranges; and
for each of the display ranges, the computation of a gain error rate by dividing the reference display value by the display value, the computation of a display resolution by dividing the display value by the AD-converted value, and the recordation of a product of the display resolution and the gain error rate as the corrected display resolution.

4. The controller of the surface texture measurement device according to claim 3, further comprising:
a level shift circuit between the sensor circuit and the range amplifier circuit, the level shift circuit configured to add a level shift amount to the measurement value from the sensor circuit, wherein the level shift amount is designated by an offset amount for each of the display ranges, received from the digital circuit, and the offset amount is treated as the level shift amount at a point when the level shift amount is controlled such that the AD-converted value is equal to a predetermined value in a state where the measurement value output from the sensor circuit is a predetermined reference voltage.

5. A method for controlling a surface texture measurement device having a displacement sensor detecting displacement of a surface of a work piece, a display displaying measurement results, and a controller processing a detection signal from the displacement sensor and displaying the measurement results on the display, the controller including:
a sensor circuit processing the detection signal from the displacement sensor and outputting the detection signal as the measurement value;
a range amplifier circuit including a plurality of range amplifiers amplifying the measurement value at different amplification factors;
an AD converter performing digital conversion of an analog signal amplified by the range amplifier circuit; and
a digital circuit processing an AD-converted value converted by the AD converter and displaying the AD-converted value on the display in a plurality of display ranges corresponding to the range amplifiers,
the method for controlling the surface texture measurement device comprising:
selecting one of the display ranges as a reference range and defining a calibration measurement value for each of the display ranges;
sequentially inputting the calibration measurement values in place of the measurement values to the range amplifier corresponding to the reference range to obtain, as a reference display value, a display value displayed on the display;
inputting the calibration measurement values corresponding to each of the display ranges in place of the respective measurement values to the range amplifiers corresponding to each of the display ranges, then obtaining the AD-converted value and the display value displayed on the display for each of the display ranges;
for each of the display ranges, computing a gain error rate by dividing the reference display value by the display value, computing a display resolution by dividing the display value by the AD-converted value, and recording a product of the display resolution and the gain error rate as the corrected display resolution; and
displaying, as the corrected display value, a product of the AD-converted value converted by the AD converter and the corrected display resolution corresponding to the display range on the display, using the digital circuit.

6. The method for controlling the surface texture measurement device according to claim 5, wherein:
the surface texture measurement device includes a level shift circuit between the sensor circuit and the range amplifier circuit, the level shift circuit adding the level shift amount to the measurement value from the sensor circuit, and
the level shift amount is designated by the offset amount for each of the display ranges, received from the digital circuit,
the method for controlling the surface texture measurement device further comprises, in each of the display ranges, the measurement value output from the sensor circuit being a predetermined reference voltage, controlling the level shift amount such that the AD-converted value is equal to a predetermined value in such a state, and treating the level shift amount at this point as the offset amount.

* * * * *